2 Sheets—Sheet 1.

J. K. CALDWELL.

Brick-Carrying Car.

No. 8,027. Reissued Jan. 8, 1878.

WITNESSES:

Saml. J. Van Stavoren

Jos. R. Connolly

INVENTOR,

John K. Caldwell

By Connolly Bros., ATTORNEYS.

2 Sheets—Sheet 2.

J. K. CALDWELL.

Brick-Carrying Car.

No. 8,027. Reissued Jan. 8, 1878.

WITNESSES:

Saml. J. Van Stavoren

Jos. B. Connolly

INVENTOR,

John K. Caldwell

By Connolly Bros, ATTORNEYS.

UNITED STATES PATENT OFFICE.

JOHN K. CALDWELL, OF PHILADELPHIA, PENNSYLVANIA.

IMPROVEMENT IN BRICK-CARRYING CARS.

Specification forming part of Letters Patent No. 75,243, dated March 10, 1868; Reissue No. 8,027, dated January 8, 1878; application filed November 27, 1877.

*To all whom it may concern:*

Be it known that I, JOHN K. CALDWELL, of Philadelphia, in the county of Philadelphia and State of Pennsylvania, have invented certain new and useful Improvements in Brick-Carrying Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 2:
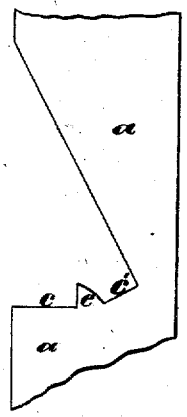
Figure 1:
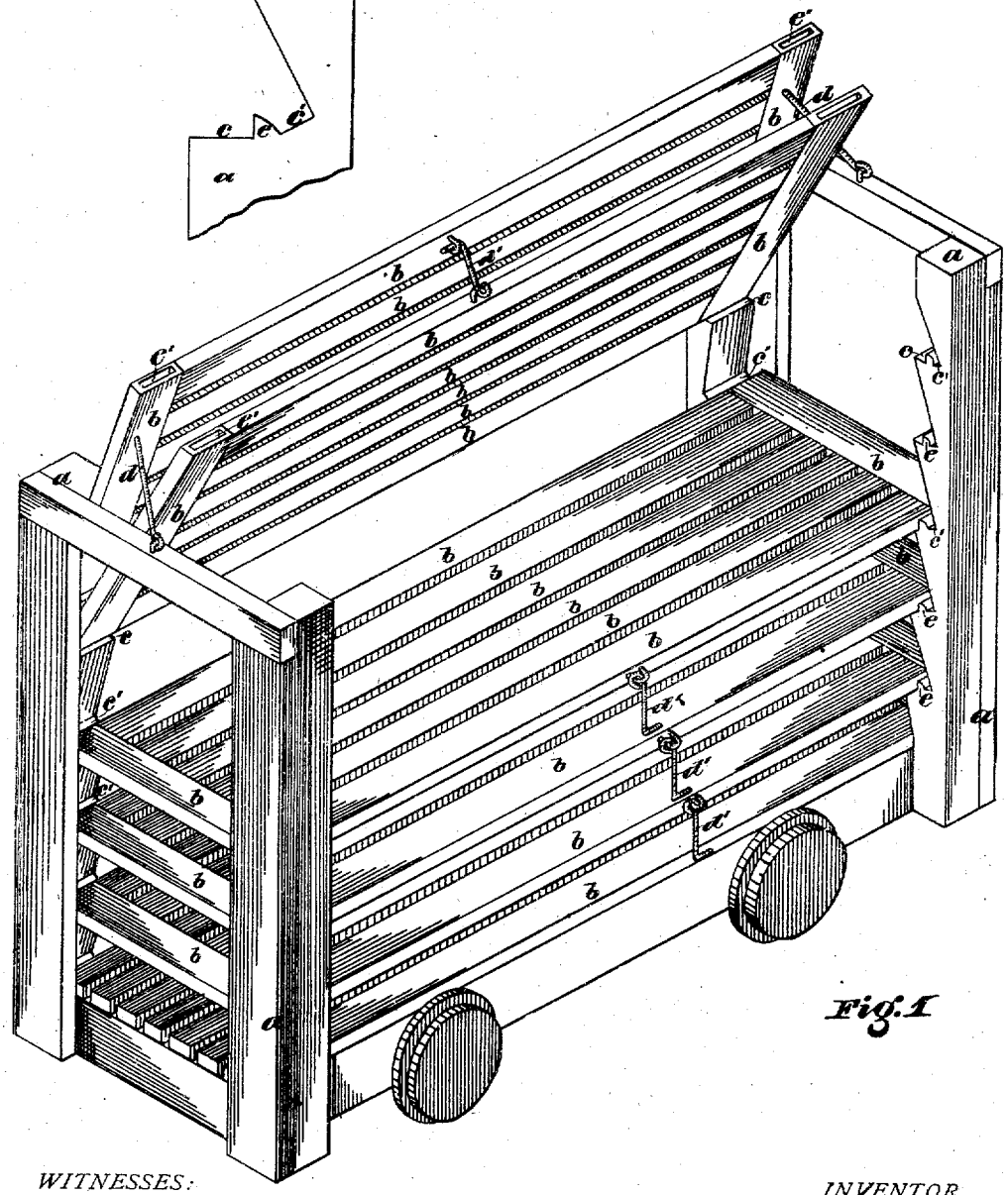
Figure 3:
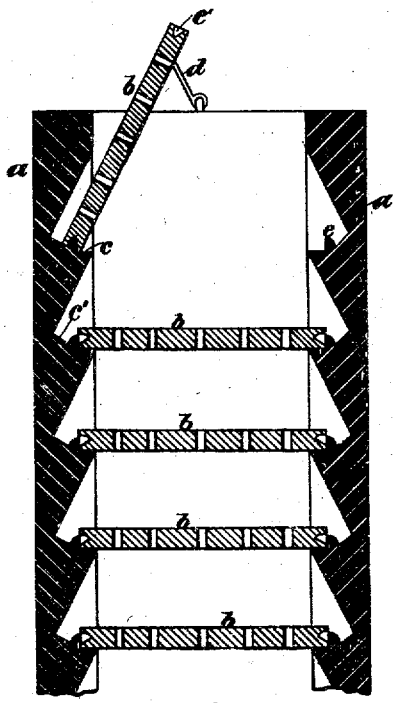
Figure 4:
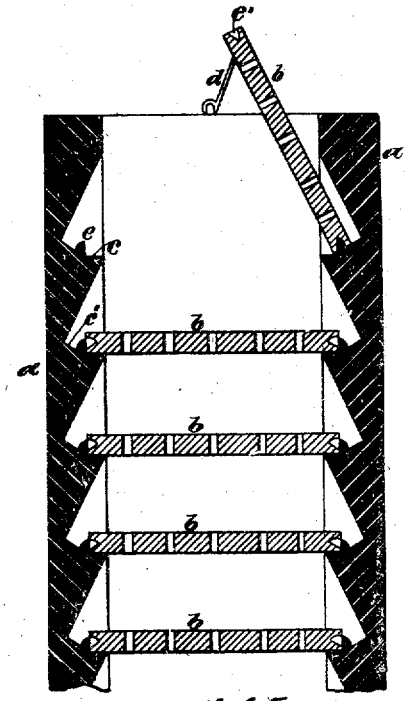

Figure 1 illustrates, in perspective, the construction of my improvement. Fig. 2 shows, by an enlarged view, the shape of the recesses in the supports; and Figs. 3 and 4 show the shape of the supports and tables, the upper ones of which are elevated, and are in transverse vertical section.

My invention consists, primarily, in so constructing the tables and supports of a drying-car that the former may be turned up or folded either to one side or to the other, at pleasure, on the latter, for convenience of loading or unloading.

My invention further consists in so constructing said tables and supports that, when the former are turned up or folded, each of said upper tables shall be out of the way of loading or unloading the next table below.

My invention still further consists in so constructing said tables that they shall have a flat bearing-surface on which to be supported when raised, as well as when lowered.

To enable others skilled in the art to make and use my invention, I will proceed to decribe its construction and mode of operation.

The upright supports *a*, I attach to a car frame or truck, of any suitable construction, but usually made low, for economy of room in the drying oven or kiln. The inner face of each support *a* is notched at intervals, to receive the tables *b*, the intervals being of such length that sufficient space will be left between each two tables, *b*, to receive a layer of bricks on their sides, edges, or ends, as may be preferred. The shape of each of these notches is shown in enlarged view in Fig. 2, *c* being the ledge on which each table rests when down, *c'* the incline on which the edge of the table rests when thrown up, and *e* the tenon, on which each table *b* is pivoted by a mortise, *e'*, in the edge of the table. Then, when each table *b* is raised, as illustrated by the two upper tables in Fig. 1, its lower edge, rolling over the tenon *e*, will be carried back from the ledge *c* to the incline *c'*, and so be more perfectly removed out of the way of loading or unloading the next lower table.

Each of the two side edges of the tables *b* is formed with a mortise, *e'*, and the supports on both sides of said tables are provided with a corresponding tenon, *e*, as shown. By this arrangement the tables are, in effect, hinged on two sides, and these hinges are yet of an open construction, so that said tables may be raised from either side at pleasure, each table turning as on a pivot, no matter on which one of its two sides it is raised.

The angle which the incline *c'* makes with a horizontal surface may be varied, according as the tables are raised more or less nearly vertical, the object being to give an even surface on which to rest the edge of each table *b*.

To load the car, I commence with the lower table, all the others being raised, and to unload commence with the upper table, and raise each table as it is unloaded.

The tables *b*, when raised, may be supported in any convenient manner by braces *d* or hooks *d'*, or by other suitable well-known devices.

The tables *b* I make of slats, as shown, with suitable openings between for the free dissemination of hot air or steam between the bricks, or in any other known way whereby the same result will be secured.

It will be observed that, as shown in the drawing, the tables *b* may fold over either way, or, if so preferred, only one way. They may in like manner be made to turn up at either or both ends, or at any desirable point between the sides or ends.

In this way I construct a car for drying brick, &c., convenient for use, of moderate cost, durable, and economical of space.

What I claim as my invention, and desire to secure by Letters Patent, is—

1. A drying-table having supports on two sides, said table and supports being provided with open hinges, which will permit the table to be raised from its support on either side, turning pivotally on the support of the other side, as and for the purpose set forth.

2. A drying-table, *b*, having mortises *e'* in its edges, in combination with supports *a*, formed with tenons *e*, substantially as shown and described.

3. A series of tables, *b*, resting and turning in recesses in the supports *a*, in a drying-car, substantially as set forth.

4. In a drying and bearing car, the supports *a*, having ledges *c*, inclines *c'*, and tenons *e*, substantially as and for the purpose set forth.

5. The combination of the tables *b*, supports *a*, ledges *c*, inclines *c'*, and tenons *e*, in a drying-car, substantially as and for the purpose specified.

6. In a drying-car, a table, *b*, sustained upon supports *a*, and adapted to turn upon one or either of its ends, in the manner herein described.

In testimony that I claim the foregoing I have hereunto set my hand this 23d day of November, 1877.

JOHN K. CALDWELL.

Witnesses:
SAML. J. VAN STAVOREN,
CHAS. F. VAN HORN.